Sept. 7, 1965   J. F. BRYAN ETAL   3,205,349
FUNCTION GENERATOR
Filed Oct. 2, 1961   2 Sheets-Sheet 1
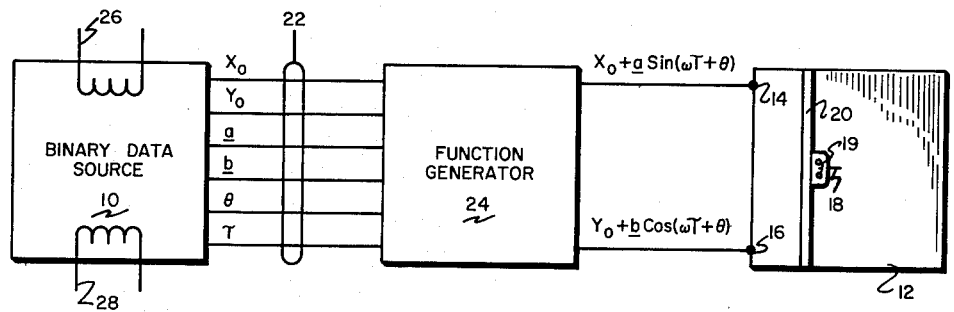
FIG. I
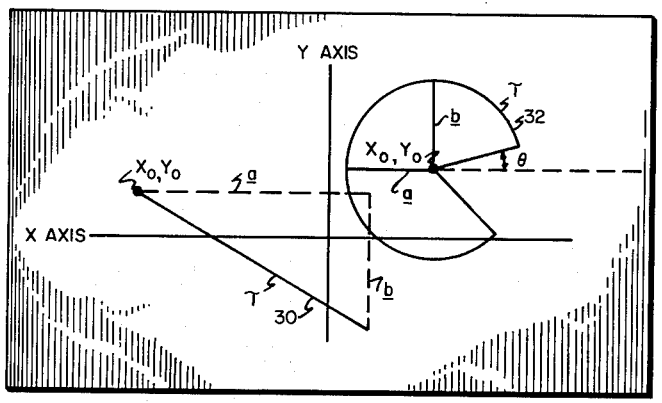
FIG. III
INVENTORS
CHARLES R. KILLIAN
JOSEPH F. BRYAN
BY *E. A. Potts*
ATTORNEY

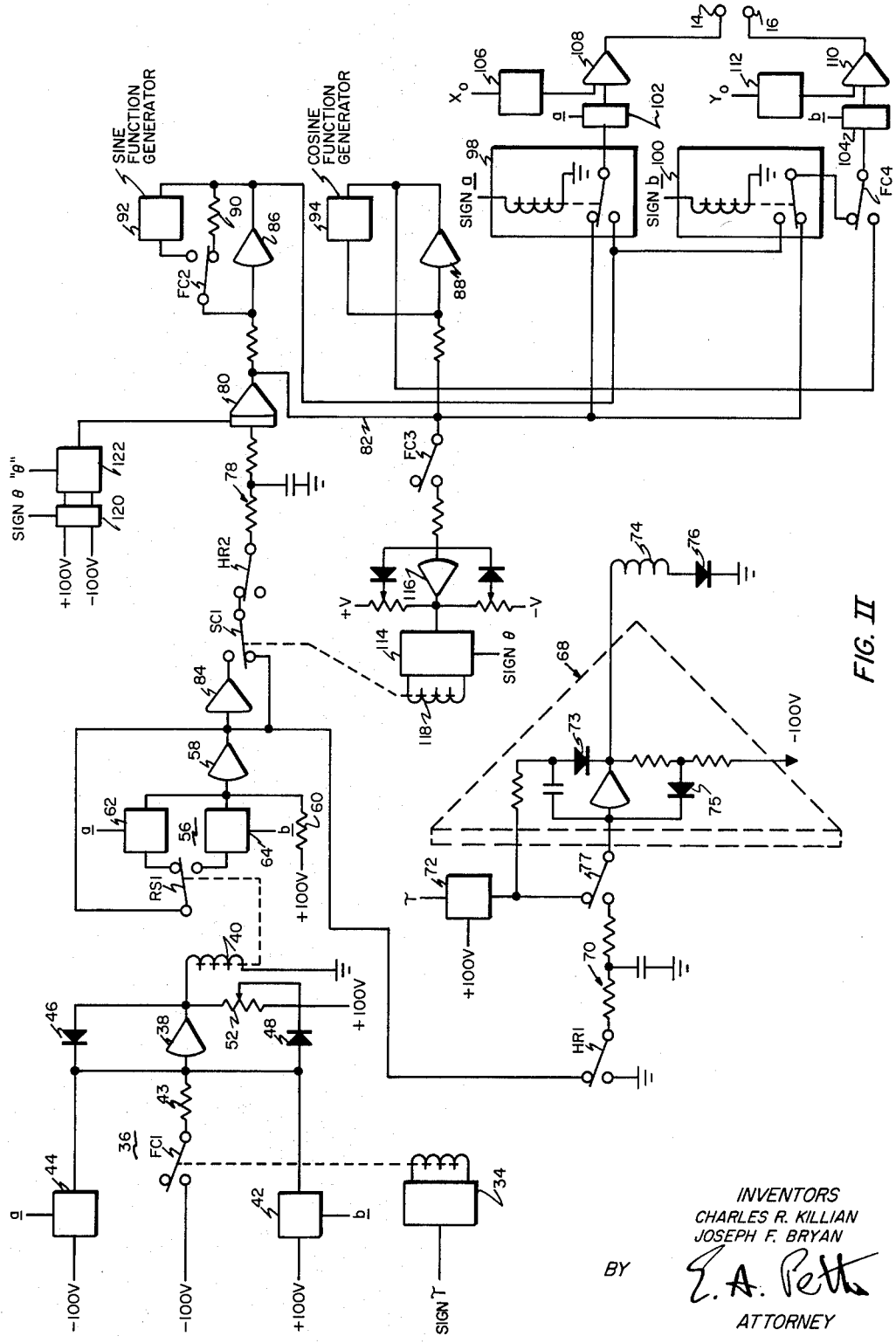
FIG. II
INVENTORS
CHARLES R. KILLIAN
JOSEPH F. BRYAN
BY E. A. Petti
ATTORNEY

United States Patent Office 3,205,349
Patented Sept. 7, 1965

3,205,349
FUNCTION GENERATOR
Joseph F. Bryan, Oceanport, and Charles R. Killian, Oakhurst, N.J., assignors to Electronic Associates Inc., Long Branch, N.J., a corporation of New Jersey
Filed Oct. 2, 1961, Ser. No. 142,189
12 Claims. (Cl. 235—197)

This invention relates generally to function generation and more particularly to means for generating functions of electrical signals suitable for application to a rectangular coordinate plotting device.

Rectangular coordinate plotting devices are well known in the art and usually comprise one or more plotting heads, such as pens or the like, which are adapted to traverse a plotting surface in response to X and Y rectangular coordinate input signals applied to a pair of driving servo-motors or the like. The X–Y input signals are usually provided in analog form, and in dependence upon whether the signals are discontinuous or continuous the usual plotting device is adapted to plot either a plurality of contiguous points or a continuous line as a function thereof. Still other plotting devices are adapted to plot continuous lines in response to periodic samples of X–Y input signals.

Although the usual plotting device has wide application, there are definite limitations on its use because of limitations imposed upon the characteristics of the input signals by the inherent characteristics of the plotting device. For example, the usual plotting device is unable to plot the function of input signals with any appreciable degree of accuracy if the rate of change of these signals exceeds the dynamic characteristics, such as acceleration, velocity and damping, of the servo system which drives the plotting head. This is particularly true where the function being plotted has sharp or radical transitions in slope. In the plotting device which periodically samples the input signals, this problem is further aggravated because the sampling period is not usually a variable one. Accordingly, this particular plotting device must complete each plot within a given sampling period irrespective of the length, curvature or position on the plotting surface of a given line or point.

It has long been considered that one or more of the variety of typical rectangular coordinate plotting devices could be adapted for use as an automatic drafting machine for producing original copies of complex mechanical, electrical, or structural drawings by being fed a source of stored data identifying the parameters of the various lines comprising the drawing. However, prior to the present invention this end had not been achieved because the usual complex drawing includes lines having the very characteristics which exceed the dynamic limitations of available plotting devices. The present invention is directed to a function generator which enables the utilization of standard commercially available plotting devices for automatic drafting service.

In its preferred form the present function generator is adapted for use with a plotting device of the periodic sampling type. There is provided within the function generator means for generating arbitrary X–Y rectangular coordinate functions in response to a source of stored data in a manner not to exceed the dynamic characteristics of a plotting device.

The source of data, which may be previously programmed and stored, or made available directly at the output terminals of a digital computer or the like, provides the parameters of lines to be drawn in the following preferred form:

$X_0$=X ordinate of the center of a circle or origin of a line;

$Y_0$=Y ordinate of the center of a circle or origin of a line;

$a$=abscissa of the radius of a circle or arc, or abscissa of a length of line;

$b$=ordinate of the radius of a circle or arc, or ordinate of a length of line;

$\theta$=starting angle of a circle or arc measured from a reference axis; and $\tau$=angular length of arc or length of line.

Within the present function generator there is provided means for periodically sampling the source of data and for developing an X and a Y input function according to the equations (1) $\qquad X = X_0 + a \sin(\omega\tau + \theta)$ (2) $\qquad Y = Y_0 + b \cos(\omega\tau + \theta)$ These functions are applied directly to the X and Y input terminals of the plotting device. The input signals corresponding to the parameters $a$ and $b$ are further utilized within the function generator for generating an $\omega$ signal which is characterized by being well within the dynamic capabilities of the plotting device.

It is, accordingly, an object of the present invention to generate X–Y rectangular coordinate functions in a manner suitable for making original copies of drawings on an X–Y rectangular coordinate plotting device.

It is another object of the present invention to generate X–Y rectangular coordinate signals in a manner not to exceed the dynamic characteristics of a plotting device which utilizes these signals.

Another object of the present invention is to generate X–Y rectangular coordinate input functions in a manner to render their accuracy insensitive to dynamic limitations imposed by a load utilizing device.

These and other objects, features, and advantages will become apparent from the following description of a preferred embodiment of this invention taken in connection with the accompanying drawings wherein:

FIG. I is diagrammatic representation of a system for automatic drafting using a function generator according to the present invention;

FIG. II is a schematic representation of the function generator according to the present invention; and FIG. III is a schematic representation of line segments which are helpful in understanding the operation of the present invention.

In order to aid in the understanding of the operation of the present function generator it is presumed that the data stored in a source 10, FIG. I, is to be plotted in rectangular coordinate form by the plotting device 12. The plotting device 12 may be of conventional form and adapted to provide graphical plots in response to X and Y analog input signals applied at the terminals 14 and 16. A plotting head 18, such as a pen, is provided at the plotting device 12 and mounted for movement along the length of a plotting arm 20. The pen 18 may be operated between a lifted and a plot position by a coil 19. Arm 20 is in turn adapted for movement in a direction normal to the direction of movement of the head 18. Suitable servomotors, not shown, are connected to the input terminals 14, 16 and control movement, respectively, of the plotting head 18 and the plotting arm 20 in response to the applied signals in order to generate rectangular coordinate plots.

The source 10 may be of any suitable form, details of which are well known in the art, and does not form part of the present invention except as to the format of the data supplied thereby. Therefore, the source 10 will not be described in detail but only to the extent necessary to facilitate explanation of its functional operation. It is presumed that the data within the source 10 is presented in the form of binary-coded digital signals, preferably stored on a magnetic tape or other suitable recording media, not shown. The various line parameters $X_0$, $Y_0$, $a$, $b$, $\theta$ and $\tau$ which define the characteristics of the various individual line segments to be drawn may be recorded serially or in parallel on the tape as individual code words or groups. Suitable decoding circuits, not shown, may also be provided within the source 10 in order to present each code word or group on a plurality of lines 22 as plural analog input signals for the function generator 24. In the present description, however, as a matter of choice, the decoding operation is presumed to take place within the function generator 24.

A suitable tape start circuit, depicted in FIG. I as a coil 26, is provided at the source 10 for purposes of initiating a tape reading operation. This start circuit may conveniently comprise a circuit sensitive to a "null" or a quiescent condition at plotting device 12. A suitable tape stop circuit, depicted as a coil 28, is also provided at the source 10 for purposes of stopping the tape and for simultaneously energizing the plural lines 22 with the input signals representing the various line parameters. Tape stop unit 28 may conveniently comprise a device sensitive to a particular code signal recorded on the tape following each above described code word or group.

In operation, the tape start circuit 26 is first enabled and a single code word or group is read from the tape within the source 10. Thereafter, tape stop circuit 28 is enabled to simultaneously stop movement of the tape and impress signals corresponding to the previously read code word onto the lines 22. At the time the lines 22 are simultaneously enabled, function generator 24 begins to generate X and Y output signals which are applied to the plotting board input terminals 14 and 16. These input signals, which correspond respectively to the functions $X_0 + a \sin(\omega\tau + \theta)$ and $Y_0 + b \cos(\omega\tau + \theta)$, will activate the plotting device 12 and a graphical representation of the two variables will be produced. When the plotting device 12 is driven to a "null" or quiescent condition, the tape start circuit 26 is once again enabled and the described operation is repeated for the next subsequently recorded code word. Thus, the recorded data is sequentially and continuously reduced to a graphical form.

Turning briefly to FIG. III, there is shown schematically a rectangular coordinate plane divided into the usual four quadrants, which, in the present example, corresponds to the plotting surface of the plotting device 12. A straight line segment 30 and an arcuate segment 32 are shown on the rectangular coordinate plane and defined in terms of the six variables, $X_0$, $Y_0$, $a$, $b$, $\theta$, and $\tau$, which are to be used throughout the present description. As seen in FIG. III, the variable $\tau$ corresponds to the length of line which is to be drawn; $X_0$, $Y_0$, identify the rectangular coordinate origin of a straight line or the center of a circle. The ratio of $a:b$ identifies the slope of a straight segment. In the case of line segment 32, $a$ and $b$ define respectively the abscissa and ordinate radius thereof, and when $a$ and $b$ are of equal length, these variables correspond to the radius of a circle. The variable $\theta$ is applicable only to arcuate line segments; in each instance it corresponds to the angular displacement of the starting point of the variable $\tau$ from a reference axis. In the present illustration, $\theta$ is measured from the X ordinate axis.

A polarity or sign may also be assigned to each of the six variables which define the lines to be drawn for purposes of further distinguishment. The polarity or sign signals may be used to distinguish a line with positive slope from a line with negative slope, to distinguish an arcuate line segment from a straight line segment and etc., as will be hereinafter described. It is possible for the sign or polarity of the variable to be carried on the same line 22 which carries the magnitude of the corresponding variable; however, in the present embodiment each such polarity or sign signal will be considered to appear on a separate corresponding line 22, not shown in FIG. I.

Although the six input signals applied to lines 22 cause substantially instantaneous operation of the plotting device 12, it is believed that the overall operation of the present function generator will be more easily understood if the various input signals are individually traced and considered to occur as a sequence of events or steps in conjunction with the circuit diagram of FIG. II.

The left-hand portion of the circuit of FIG. II concerns itself generally with the interpretation of the input signals appearing on the lines 22 for purposes of distinguishing between an arc and a straight line. This circuit further generates a rate signal which is characteristic of the length of line to be drawn by the plotting device 12. The right-hand portion of the circuit of FIG. II generates the X and Y input signals for the plotting device 12. Turning first to the left-hand portion of FIG. II, the sign of the input signal which corresponds to $\tau$, the length of line, is arbitrarily utilized for purposes of distinguishing an arc from a line. The sign signal $\tau$ is applied to a function selector relay 34 which includes a coil for operating a plurality of normally open contacts FC1–FC4 between controlling positions. In the present description the presence of a sign signal $\tau$ will define an arcuate line; the absence of a sign signal $\tau$ will define a straight line. Relay 34 will be energized when the code word defines a circular or arcuate line segment and will be de-energized when it defines a straight line segment.

The input signals which correspond to the amplitude of $a$ and $b$, viz., the abscissa and ordinate radius of a circle or the slope of a line, are initially applied to a rate selector circuit, indicated generally at 36, to influence the generation of a rate signal which is suitable for application to the plotting device 12. Selector circuit 36 is shown to comprise an amplifier 38 which has an input terminal connected to receive the amplitude signals $a$ and $b$ and which has an output terminal connected to a rate selector relay coil 40. The amplifier 38 preferably has a wide-band, high-gain characteristic and may be stabilized by the well known chopper stabilization technique, an understanding of which is not essential to the understanding of the present invention. The remainder of the amplifiers to be hereinafter described also preferably have characteristics similar to that of amplifier 38. Hereinafter, unless stated otherwise, each described amplifier will be considered to have a gain of $-1$.

The lines 22 which correspond to the amplitude of input signals $a$ and $b$ are connected directly to the input terminal of amplifier 38 via corresponding decoding circuits 42 and 44. Suitable sources of operating potential, indicated as $+100$ v. and $-100$ v., are connected to decoding circuits 42 and 44 respectively. These decoding circuits as well as other decoding circuits to be hereinafter described, may conveniently comprise well known binary-weighted resistor decades, relay-contact voltage dividers, or similar apparatus for decoding digital signals into corresponding analog signals. An additional source of operating potential, indicated as $-100$ v., is also connected to the input terminal of amplifier 38 via the normally open switch contact FC1 and a resistor 43.

The cathode and anode respectively of a pair of similar diode elements 46, 48 are connected directly to the input terminal of the amplifier 38. The output terminal of the amplifier 38 is connected to a source positive potential via the resistor 52. A feedback circuit for the amplifier 38 is completed by a connection between the anode of diode 46 and the amplifier output terminal and by a connection between the cathode of the diode 48 and a tap terminal on the resistor 52. The rate selector circuit 36 is completed by a relay 40 which is shown to have its coil connected between the output terminal of amplifier 38 and ground potential.

The digital signals representing the amplitude of line parameters $a$ and $b$ are converted to corresponding analog signals of opposed polarity at the decoding circuits 42 and 44. These analog signals are summed algebraically at the input terminal of the amplifier 38 to produce an output signal therefrom which is related to the dominant of these two signals. By way of example, when the amplitude of the *a* signal is dominant, the amplifier output signal is zero and coil 40 is de-energized. A dominant *b* signal produces a negative output at amplifier 38 to cause energization of rate selector coil 40.

Diodes 46, 48 operate in the manner of a well known soft-limiting circuit about the amplifier 38 to insure positive energization and de-energization of the coil 40 by producing a predetermined minimal amplitude of signal output from the amplifier. However, when the *a* and *b* signals are of equal amplitude, such as when a circle is to be drawn, viz., $a=b=$the radius of a circle, the relay coil 40 could conceivably chatter because of the soft-limiting circuit about the amplifier. The relay contacts FC1 are, however, in their closed position when a circle is being drawn and the −100 v. potential connected to these contacts is then being applied directly to input resistor 43 to cause amplifier 30 to maintain the relay coil 40 de-energized.

A contact RS1 is actuated between controlling positions in response to the condition of energization of the rate selector coil 40 and enables the generation of a rate signal by a rate generator indicated generally at 56. The rate generator 56 comprises an amplifier 58 which includes an input impedance element 60 coupled to a fixed potential source indicated as +100 v. This amplifier is further provided with a first feedback network comprising a series circuit arrangement of the contacts RS1 and a decoding circuit 62. A second feedback network for amplifier 58 comprises a series circuit arrangement of the contacts RS1 and a decoding circuit 64. The lines 22 which correspond to the amplitude of *a* and *b* are connected respectively to the decoding circuits 62 and 64.

The contact RS1 is in the position shown in FIG. II when the coil 40 is de-energized, such as when the amplitude of the *a* signal is dominant. In this condition of the contacts, decoding circuit 62 is disposed in the feedback circuit of amplifier 58 and the amplitude of the negative output signal therefrom is found to be inversely proportional to the amplitude of the *a* input signal. Amplifier 58 generates a negative output signal which is inversely proportional to the amplitude of *b* when the amplitude of the *b* signal is dominant. Thus, the amplitude of the output signal from amplifier 58 is always inversely proportional to whichever of the signals *a* or *b* is larger. In the description which follows, it is assumed that this output rate signal corresponds to and has an amplitude which is proportional to $\omega$ in Equations 1 and 2.

The rate output signal taken from amplifier 58 is next applied via the contact HR2 to a timing circuit or low-pass filter 78. The components of filter 78 are selected to match the acceleration characteristics of the servo-system associated with the plotting device 12 so that the rate of change of an amplified input signal will be sufficiently delayed in time so as not to exceed the acceleration characteristics of the plotting device 12 irrespective of the eventual maximum amplitude of this signal. The other end of timing circuit 78 is connected directly to the input terminal of an integrator 80. The integrator 80 has its output terminal connected to a bus 82 for delivering an output signal in the form of a ramp function, the slope of which does not exceed the velocity characteristic of the plotting device 12. The signal appearing on the line 82 is utilized in the remainder of the circuit of FIG. II for purposes of generating X and Y signals according to Equations 1 and 2.

An integrator 68 controls the length of line which is to be drawn and has its input terminal connected directly to the output terminal of amplifier 58 via a normally closed contact HR1 and an acceleration circuit 70. Acceleration circuit 70 comprises a conventional T-network or low-pass filter which is accurately matched to filter 78 for purposes of matching the rise time of the input signal to integrator 68 to that of the input signal to integrator 80.

A decoding network 72 delivers a second input signal to the integrator 68 and is shown with one input terminal connected to a source of operating potential, indicated as +100 v., and another input terminal connected directly to the line 22 which correspond to the amplitude of the signal $\tau$. This second input signal is of an opposite polarity to that of the output signal from amplifier 58 and provides for an initial condition at the integrator. A relay coil 74, disposed in the output circuit of integrator 68, is shown to have one end connected to ground via the diode element 76. When de-energized, coil 74 actuates the pair of contacts HR1 and HR2 to their closed position, as shown in FIG. II. The integrator 68 comprises the usual high gain D.C. amplifier-integrating capacitor combination, and further comprises a diode 73 connected in the integrating capacitor circuit and a positively biased diode 75 connected in shunt to the amplifier. A single-pole, double-throw reset-operate switch 77 may also be provided between the filter 70 and the input of the amplifier. In the reset position of the switch 77 the signal from network 72 impresses an initial charge on the integrating capacitor; in the operate position of the switch the signal from filter 70 is applied directly to the input of the amplifier.

Immediately upon energization of the $\tau$ line 22 the integrator 68 produces a negative output signal which is related in amplitude to the amplitude of $\tau$. The coil 74 is de-energized in this condition of the amplifier. When switch 77 is moved to an operate position the $\omega$ signal from amplifier 58 is applied to integrator 68 via the acceleration circuit 70 and the closed contact HR1. This signal being of an opposite polarity to that of the $\tau$ signal impressed on integrator 68, the amplitude of the output signal from integrator 68 will diminish toward zero at a rate determined by the time constant of the integrator and the amplitude of the input signal from amplifier 58. When the amplitude of the integrator output signal passes through zero, diode 73 ceases to conduct, diode 75 conducts heavily at a limited amplitude of potential, and the coil 74 becomes energized. Contacts HR1 are actuated to an open position and the $\omega$ signal is disconnected from the acceleration circuit 70.

The time duration between the de-energized condition of coil 74 and the energized condition of the coil is a function of $\omega\tau$ in Equations 1 and 2. This timing period is in turn a direct function of the length of line which is to be drawn and controls the plotting period of the plotting device 12 for each line segment. The timing period $\omega\tau$ will naturally be of short duration for a short line segment and will be of a substantially longer duration for a substantially longer line segment. By accurately matching the well known characteristics of the acceleration circuits 70 and 78 to the acceleration characteristics of the plotting device 12 the timing period $\omega\tau$ can be accurately matched to the dynamic capabilities of the plotting device 12 so as to enable it to draw or plot lines of any length or configuration with the same degree of accuracy.

At the conclusion of a timing period the coil 74 may actuate another pair of contacts, not shown, to an operative position in order to de-energize the coil 19 and lift the pen 18 from the plotting surface. Similarly, the pen 18 may be placed into a plot position in contact with the plotting surface by energizing the coil 19 through the use of these same contacts operated by the coil 74. The problem associated with designing a timing circuit to match the deceleration characteristics of the plotting device is avoided by lifting the pen 18 at the conclusion of a plotting period. Additional circuits, not shown, may also be provided for disabling the plotting device servo motors while the circuits within the function generator are being switched in order to avoid subjecting them to the switching transients.

In order to enable the generation of sine and cosine functions it is necessary that the $\omega\tau$ output signal from integrator 80 be of either polarity or phase. To this end, an inverting amplifier 84 is provided between the amplifier 58 and the timing circuit 78. A single-pole, double-throw switch SC1 is disposed in a series circuit arrangement with the switch HR2 for connecting either the output of amplifier 58 or the output of amplifier 84 to the input of integrator 80. The switch SC1 remains in the position shown in FIG. II during the generation of straight line functions. The ramp function which appears on bus 82 is applied directly to a first and second amplifier 86 and 88 via suitable input resistors. Amplifier 86 is provided with a feedback resistor element 90 and with a sine function generator feedback element 92. The switch contact FC2 is also disposed in the feedback circuit of this amplifier and adapted for connecting either the feedback element 90 or the feedback element 92 in shunt to the amplifier. The amplifier 88 is provided with a single feedback 94 in the form of a well-known cosine function generator.

A pair of single-pole double-throw switches 98 and 100 are provided at the output terminal of amplifier 86 for the purposes of polarizing the output signal from this amplifier. Each of these switches have one stationary pole connected to the amplifier output terminal and another stationary pole connected directly to the bus 82. The switches 98, 100 may be operated electrically in response to polarity signals received from the lines 22 corresponding to the parameters $a$ and $b$. To this end, an operating coil for the switch 98 may be connected directly to the line 22 which corresponds to the polarity of $a$. An operating coil for the switch 100 may be similarly connected to the line 22 which corresponds to the polarity of $b$. Switches 98, 100 are presumed de-energized as shown in FIG. II. In this position of the switches the $a$ and $b$ parameters are presumed to be positive. Negative $a$ and $b$ line parameter signals cause energization of the operating coils for switches 98 and 100 and enable them to complete the connection to the output terminal of amplifier 86.

Signals taken from the switches 98, 100 are applied directly to a pair of similar decoding circuits 102, 104 and there attenuated in accordance with the amplitude of the $a$ and $b$ line parameters. To this end, the decoding circuits 102, 104 are connected respectively to the $a$ and $b$ amplitude lines 22. The output signal from decoding circuit 102 is thereafter summed with the $X_0$ amplitude signal received from a decoding circuit 106 at the input of amplifier 108 and applied to the input terminal 14. Amplifier 110 delivers an input signal to terminal 16 which is equal to the sum of the output signals from decoding circuits 104 and 112. Decoding circuit 112 receives an input signal from $Y_0$ amplitude line 22.

Assume for purposes of illustration that the straight line segment 30 is to be drawn by the plotting device 12, and that the lines 22 are presently excited with digital signals representing the various parameters of the lines after operation of the tape stop circuit 28. Amplifiers 108 and 110 instantaneously produce $X_0$, $Y_0$ input signals for application to the plotting device 12. These $X_0$, $Y_0$ input signals are of an appropriate amplitude and are polarized positively and negatively respectively to cause pen 18 to be positioned at the origin of the line 30.

Simultaneously, the $a$ and $b$ line parameter amplitude signals are applied to the decoding circuits 42, 44, 62, 64, 102 and 104. Since the $a$ line parameter is of greater length than the $b$ line parameter, amplifier 38 produces no output signal, coil 40 remains de-energized, and contact RS1 remains in the position shown on FIG. II. In this condition of the contact RS1 decoding circuit 62 forms the feedback circuit for amplifier 58 and the output signal therefrom rises to a negative amplitude which is inversely proportional to the amplitude of the line parameter $a$.

Meanwhile, the $\tau$ amplitude signal has been applied to integrator 68 via the decoding circuit 72 and the output signal from this integrator has assumed some negative amplitude to permit de-energization of the coil 74, the attendant closure of contacts HR1 and HR2, and the engagement of pen 18 with the plotting surface. With contacts HR1 and HR2 in a closed position, the output signal from amplifier 58 is applied to the timing circuits 70 and 78. After similar appropriate delays, this output signal is applied simultaneously to the integrators 68 and 80 via the timing circuits.

In the case of a straight line segment it is convenient to fix the $\tau$ signal at its maximum amplitude irrespective of line length which is to be drawn; this permits the pen 18 to transverse the maximum linear length of plotting surface 12 at speeds determined only by the dynamic capabilities of the plotting device 12. In the case of arcuate segments $\tau$ varies with each line. The maximum amplitude of $\tau$ is used only for circles, i.e., 360° lengths of arc. Thus, in the case of a straight line segment, the initial negative output signal from integrator 68 is fixed at the maximum amplitude of $\tau$. The output signal from integrator 80 is initially zero and increases in amplitude in a positive direction at a rate which corresponds to the time constant of the integrator and the amplitude of the output signal from amplifier 58. Similarly, the amplitude of the output signal from integrator 68 decreased toward zero at this same rate. The maximum amplitude of output signal from integrator 80 is reached when the output from integrator 68 passes through zero, i.e., becomes positive, and contacts HR1, HR2 are actuated to an open position.

The output signal from amplifier 80 is applied simultaneously to one stationary contact of the switches 98 and 100 and to the input terminals of amplifiers 86 and 88. Since, in the case of line parameter 30 the $a$ line parameter is positive and the $b$ line parameter is negative, the operating coil for the switch 98 will remain de-energized and the operating coil for the switch 100 will become energized. Accordingly, switch 98 delivers a signal with a positively increasing slope to the decoding circuit 102 and switch 100 delivers a signal with a similarly increasing negative slope to the decoding circuit 104. After suitable attenuation within the circuits 102 and 104, these signals now correspond respectively in amplitude to the $a$ and $b$ line parameters and are summed at the amplifiers 108 and 110 with the corresponding $X_0$ and $Y_0$ input signals. In response to these varying X and Y ordinate input signals the pen 18 is driven across the plotting surface and graphically represents the line 30 in FIG. III. After a suitable time duration determined by the integrator 68 the coil 74 becomes de-energized to open the contacts HR1 and HR2. The input signal is removed from the integrator 80, and in turn, the input signals are removed from the terminals 14 and 16. The pen 18 is lifted from the plotting surface when coil 74 becomes de-energized and the line 30 is produced as shown.

Obviously, the $X_0$, $Y_0$ origin of the line 30 may be selected at the terminus of the line shown in FIG. III and may terminate at the indicated origin. In this case, the initial $X_0$, $Y_0$ input signals would be of an opposite polarity, and the position of switches 98 and 100 would be reversed to achieve the requisite polarity for $a$ and $b$. In all other respects, the operation of the system would be exactly as described.

The operation of the circuit of FIG. II up to and including integrator 80 is substantially as described when generating functions suitable for plotting arcuate lines. The output signal taken from integrator 80 may then be applied to suitable electro-mechanical resolvers, as is well known, for purposes of generating sine and cosine functions which are thereafter summed with the $a$, $X_0$ and $b$, $Y_0$ signals at the amplifiers 108 and 110. Alternatively, the sine and cosine functions may be generated at the amplifiers 86 and 88 through the use of the feedback elements 92 and 94. Feedback elements 92, 94 are well known, and preferably comprise a plurality of weighted-resistors operating in conjunction with diode switches for altering input signals in accordance with the sine and cosine functions. To achieve this end, the input signals applied to these feedback elements must be in the form of recurring saw-tooth waves, as is well known. For this purpose, there is provided means for periodically reversing the slope of the output signal from integrator 80. In FIG. II this means is seen to comprise a decoding circuit 114 adapted to receive an input signal from the line 22 which corresponds to sign of $\theta$ and an input signal from a polarity reversing amplifier 116. A coil 118 is energized in response to these signals and actuates the relays contacts SC1 between positions. Amplifier 116 receives an input signal directly from the bus 82 and is provided with suitably weighted feedback resistors operating in conjunction with biased diodes for impressing input signals on coil 118 upon attainment of particular signal conditions on the bus. The switch contact FC3 is disposed in the input circuit of amplifier 116 for inactivating this amplifier during generation of straight line segments.

During generation of arcuate segments the output signal from integrator 80 is adapted to be set to some initial condition which corresponds to the angular displacement $\theta$ of the starting point of the line parameter $\tau$ from the X ordinate axis. To this end, the integrator 80 receives input signals from the decoding circuits 120, 122. In turn, these decoding circuits receive input signals from the $\theta$ polarity and amplitude lines 22. The switch means 100 is not utilized for the generation of arcuate segments; instead, decoding circuit 104 receives input signals from the amplifier 88 via the switch FC4 upon energization of the coil 34. The $a$ polarity input signal is arbitrarily selected to be negative for an arcuate line segment; the operating coil for switch 98 remains de-energized and connects decoding circuit 102 directly to the amplifier 86.

In generating a function suitable for graphically presenting the curve 32, the corresponding $a$ and $b$ line parameters again cause generation of an appropriate rate signal at the amplifier 58. The operation of integrator 68 will be described for purposes of generating a timing period of suitable duration within which to complete the plot. Since the sign of $\theta$ is positive for line 32, coil 118 remains de-energized and a suitable initial positive $\theta$ amplitude will be established at the output terminal of integrator 80. Thereafter, responsive to the output signal from amplifier 58, the output signal from integrator 80 will increase in amplitude with a positive slope. This signal will be alerted at the amplifiers 86 and 88 in accordance with the sine and cosine functions to produce signals which are respectively proportional to sine $(\omega\tau+\theta)$ and cosine $(\omega\tau+\theta)$. After attenuation at the decoding circuits 102, 104 these signals correspond respectively to $a$ sine $(\omega\tau+\theta)$ and $b$ cosine $(\omega\tau+\theta)$. Summing these signals with $X_0$, $Y_0$ at the amplifiers 108, 110, it is seen that the X and Y input functions are established according to Equations 1 and 2.

So long as the combined arcuate length of $\tau+\theta$ is not required to cross an imaginary Y ordinate axis drawn through its $X_0$, $Y_0$ rectangular coordinate origin, i.e., is of a length to lie in one quadrant, the operation of amplifier 116 may be ignored. In the event that the combined arcuate length of $\tau+\theta$ crosses this imaginary Y axis, i.e., is of a length to lie in at least two quadrants, as is the case of segment 32, the amplifier 116 will operate to cause periodic slope reversals of the ramp function being produced by the integrator 80. A +100 v. and −100 v. output from integrator 80 is selected arbitrarily to correspond to the amplitude of signal which will cause an arcuate segment to intersect the imaginary Y axis above and beneath the imaginary X axis. These arbitrary voltages correspond respectively to the 0°, 90°, 180° and 360° points of a sine or cosine wave, viz., the points of slope reversal.

The diode and resistor feedback networks associated with the amplifier 116 are adjusted to produce an output signal only at +100 v. and −100 v. In the case of line segment 32, coil 118 will initially be de-energized and the negative output signal from amplifier 58 will be applied to integrator 80. When the output signal from integrator 80 reaches +100 v., amplifier 116 will produce an output signal, coil 118 will become energized, and contacts SC1 will connect the positive output from amplifier 84 to the integrator 80. In turn, the positive output signal from this integrator will diminish in amplitude toward zero, become negative, and thereafter increase negatively until its amplitude equals −100 v. At this time amplifier 116 will again produce an output signal, de-energize coil 118 and re-establish the initial condition of the contacts SC1. The negative output from integrator 80 will continue to diminish in amplitude toward zero until contacts HR1, HR2 are actuated to an open position, terminating the generation of the function.

As should be apparent, the amplitude and polarity signals of the angle $\theta$ which are applied to the integrator 80 establish the quadrant in which an arcuate segment is to be drawn. Similarly, the initial condition of coil 118, as determined by the polarity of $\theta$, will determine the direction in which the arcuate segment is to be drawn.

While only one embodiment of the present invention has been shown and described herein, and inasmuch as this invention is subject to many variations, modifications and reversals of parts, it is intended that all matter contained in the above description shall be interpreted as illustrative and not in a limiting sense.

We claim:
1. In a system for generating rectangular coordinate functions for application to the X and Y input terminals of a rectangular coordinate plotting device, the combination comprising a source of data providing electrical signals corresponding to the line parameters $X_0$, $Y_0$, $a$, $b$ and $\tau$, wherein $X_0$ and $Y_0$ correspond to the rectangular coordinate origin of a line, $a$ and $b$ correspond respectively to the ordinate and abscissa of the line, and $\tau$ corresponds to the length of the line, means connected to said source of data and responsive to said $a$ and $b$ signals for generating a rate signal which is proportional to the larger of the parameters $a$ or $b$, first means connected to the X input terminal for attenuating said rate signal in proportion to the amplitude of said parameter $a$ and for summing same with the electrical signal which corresponds to said parameter $X_0$, second means connected to the Y input terminal for attenuating said rate signal in proportion to the amplitude of said parameter $b$ and for summing same with the electrical signal which corresponds to $Y_0$, and timing means including a switching element operative in response to the amplitude of said $\tau$ signal for connecting said generating means to said first and second means.

2. In a system for generating rectangular coordinate functions for aplication to the X and Y input terminals of a rectangular coordinate plotting device, the combination comprising a source of data for periodically providing signals corresponding to the line parameters $X_0$, $Y_0$, $a$, $b$ and $\tau$, wherein $X_0$ and $Y_0$ correspond to the rectangular coordinate origin of a line, $a$ and $b$ correspond respectively to the ordinate and abscissa of the line, and $\tau$ corresponds to the length of the line, means connected to said source of data and responsive to said parameters $a$ and $b$ for generating a rate signal which is inversely proportional to the larger of the parameters $a$ or $b$, first means connected to the X input terminal for attenuating said rate signal in proportion to said parameter $a$ and for summing same with said parameter $X_0$, second means connected to the Y input terminal for attenuating said rate signal in proportion to said parameter $b$ and for summing same with said parameter $Y_0$, and means including a switching element and establishing a timing period in response to the amplitude of said $\tau$ and rate signals for disconnecting said generating means from said first and second means.

3. In a system for generating rectangular coordinate functions for application to the X and Y input terminals of a rectangular plotting device, the combination comprising a source of data for periodically providing signals corresponding to the line parameters $X_0$, $Y_0$, $a$, $b$ and $\tau$, wherein $X_0$ and $Y_0$ correspond to the rectangular coordinate origin of a line, $a$ and $b$ correspond respectively to the ordinate and abscissa of the line, and $\tau$ corresponds to the length of the line, means connected to said source of data and responsive to said parameters $a$ and $b$ for generating a signal the amplitude of which is inversely proportional to the larger of the parameters $a$ or $b$, a pair of integrating means connected to said generating means and producing output signals which are varied in amplitude in response to signals received therefrom, first means connected to the X input terminal and to one of said integrating means for attenuating the signal therefrom in proportion to said parameter $a$ and for summing same with said parameter $X_0$, second means connected to the Y iput terminal and to said one integrating means for attenuating the signal therefrom in proportion to said parameter $b$ and for summing same with said parameter $Y_0$, and means including a switching element operative in response to said $\tau$ signal for establishing an initial condition of the output signal from the other of said integrating means and for disconnecting said generating means from said first and second means upon attainment of a particular amplitude of the signal from said other integrating means.

4. The combination defined in claim 3 wherein the pair of integrating means have substantially the same time constant and the output signal from said one integrating means attains a predetermined amplitude at substantially the same time that the means including a switching element disconnects said generating means from said pair of integrating means.

5. In a system for generating rectangular coordinate functions for application to the X and Y input terminals of a rectangular plotting device, the combination comprising a source of data for periodically providing signals corresponding to the line parameters $X_0$, $Y_0$, $a$, $b$ and $\tau$, wherein $X_0$ and $Y_0$ correspond to the rectangular coordinate origin of a line, $a$ and $b$ correspond respectively to the ordinate and abscissa of the line, and $\tau$ corresponds to the length of the line, means connected to said source of data and responsive to said $a$ and $b$ signals for generating a signal the amplitude of which is inversely proportional to the larger of the parameters $a$ or $b$, a pair of integrating means each including a signal delay network at its input terminals for producing output signals which are varied in amplitude at a rate determined by the output signal from said generating means, first means connected to the X input terminal and to one of said integrating means for attenuating the signal therefrom in proportion to said parameter $a$ and for summing same with said parameter $X_0$, second means connected to the Y input terminal and to said one integrating means for attenuating the signal therefrom in proportion to said parameter $b$ and for summing same with said parameter $Y_0$, and means including a switching element operative in response to said $\tau$ signal for establishing an initial condition of the output signal from the other of said integrating means and for disconnecting said generating means from said first and second means upon attainment of a particular amplitude of the signal from said other integrating means.

6. In a system for generating rectangular coordinate functions for application to the X and Y input terminals of a rectangular plotting device, the combination comprising a source of data for periodically providing polarized signals corresponding to the line parameters $X_0$ $Y_0$, $a$, $b$ and $\tau$, wherein $X_0$ and $Y_0$ correspond to the rectangular coordinate origin of a line, $a$ and $b$ correspond respectively to the ordinate and abscissa of the line, and $\tau$ corresponds to the length of the line, means connected to said source of data and responsive to said $a$ and $b$ signals for generating a signal the amplitude of which is inversely proportional to the larger of the parameters $a$ or $b$, a pair of similar integrating means each including a similar signal delay network at its input terminals for producing output signals which are varied in amplitude at the same rate in response to the output signal received from said generating means, first means connected to the X input terminal and to one of said integrating means for attenuating the signal therefrom in proportion to said parameter $a$ and for summing same with said parameter $X_0$, second means connected to the Y input terminal and to said one integrating means for attenuating the signal therefrom in proportion to said parameter $b$ and for summing same with said parameter $Y_0$, and means including a switching element operative in response to said $\tau$ signal for establishing an initial condition of the output signal from the other of said integrating means and for disconnecting said generating means from said first and second means upon attainment of a particular amplitude of the signal from said other integrating means.

7. The combination defined in claim 6 where switch means are provided at the output terminals of said one integrating means for polarizing the output signal therefrom in response to the polarity of the signals corresponding to the $a$ and $b$ line parameters.

8. In a system for generating rectangular coordinate function for application to the X and Y input terminals of a rectangular plotting device, the combination comprising a source of data providing electrical signals corresponding to the line parameters $X_0$, $Y_0$, $a$, $b$, $\theta$ and $\tau$, wherein $a$ and $b$ correspond to the ordinate and abscissa radius of an arcuate line, $X_0$, $Y_0$ correspond to the rectangular coordinate origin of the line, $\tau$ corresponds to the arcuate length of the line, and $\theta$ corresponds to the angular displacement of the starting point of $\tau$ from a reference axis, means connected to said source of data and responsive to said $a$ and $b$ signals for generating a rate signal which is variable in amplitude in inverse proportion to the larger of the parameters $a$ or $b$ and which has an initial amplitude proportional to $\theta$, means generating a sine and a cosine signal responsive to said rate signal, first means connected to the X input terminal for attenuating said sine signal in proportion to said parameter $a$ and for summing same with said parameter $X_0$, second means connected to the Y input terminal for attenuating said cosine signal in proportion to said parameter $b$ and for summing same with said parameter $Y_0$, and timing means including a switching element operative in response to said $\tau$ signal for initially connecting said sine and cosine signal generating means to said rate signal generating means.

9. In a system for generating rectangular coordinate functions for application to the X and Y input terminals of a rectangular plotting device, the combination comprising a source of data providing electrical signals corresponding to the line parameters $X_0$, $X_0$, $a$, $b$, $\tau$ and $\theta$, wherein $a$ and $b$ correspond to the ordinate and abscissa radius of an arcuate line, $X_0$, $Y_0$ correspond to the rectangular coordinate origin of the arcuate line, $\tau$ corresponds to the arcuate length of the line, and $\theta$ corresponds to the angular displacement of the starting point of the $\tau$ signal from a reference axis, means connected to said source of data and responsive to said $a$ and $b$ signals for generating a rate signal which is variable in amplitude in proportion to the larger of the parameters $a$ or $b$ and which has an initial amplitude proportional to $\theta$, means generating a sine and a cosine signal responsive to said rate signal, first means connected to the X input terminal for attenuating said sine signal in proportion to said parameter $a$ and for summing same with said parameter $X_0$, second means connected to the Y input terminal for attenuating said cosine signal in proportion to said parameter $b$ and for summing same with said parameter $Y_0$, timing means including an electrical integrator for producing an output signal which is variable in amplitude in proportion to the larger of the parameters $a$ or $b$ and which has an initial amplitude proportional to $\tau$, and switch means operated between controlling positions in response to a particular amplitude of the output signal from said integrator for disconnecting said sine and cosine signal generating means from said rate signal generating means.

10. In a system for generating rectangular coordinate functions for application to the X and Y input terminals of rectangular plotting devices, the combination comprising a source of data for periodically providing electrical signals corresponding to the line parameters $X_0$, $Y_0$, $a$, $b$, $\tau$ and $\theta$, wherein $a$ and $b$ correspond to the ordinate and abscissa radius of an arcuate line, $X_0$, $Y_0$ correspond to the rectangular coordinate origin of the line, $\tau$ corresponds to the arcuate length of the line, and $\theta$ corresponds to the angular displacement of the starting point of the $\tau$ signal from a reference axis, means connected to said source of data and responsive to said $a$ and $b$ signals for generating a rate signal which is variable in amplitude in proportion to the larger of the parameters $a$ or $b$, means impressing said $\theta$ signal on said generating means for establishing an initial amplitude and polarity of said rate signal, means generating a sine and a cosine signal responsive to said rate signal, first means connected to the X input terminal for attenuating said sine signal in proportion to said parameter $a$ and for summing same with said signal corresponding to said parameter $X_0$, second means connected to the Y input terminal for attenuating said cosine signal in proportion to said parameter $b$ and for summing same with said signal corresponding to said parameter $Y_0$, and means including a switching element for connecting said sine and cosine signal generating means to said rate signal generating means in response to said $\tau$ signal and for disconnecting said sine and cosine signal generating means from said rate signal generating means after a predetermined timing period.

11. In a system for generating rectangular coordinate functions for application to the X and Y input terminals of a rectangular plotting device, the combination comprising a source of data for periodically providing electrical signals corresponding to the line parameters $X_0$, $Y_0$, $a$, $b$, $\tau$ and $\theta$, wherein $a$ and $b$ correspond to the initial and final radius of an arcuate line, $X_0$, $X_0$ correspond to the rectangular coordinate origin of the line, $\tau$ corresponds to the arcuate length of the line, and $\theta$ corresponds to the angular displacement of the starting point of the $\tau$ signal from a reference axis, means connected to said source of data and responsive to said $a$ and $b$ signals for generating a rate signal which is variable in amplitude in proportion to the larger of the parameters $a$ or $b$, means impressing said $\theta$ signal on said generating means for establishing an initial amplitude and polarity of said rate signal, means generating a sine and a cosine signal responsive to said rate signal, first means connected to the X input terminal for attenuating said sine signal in proportion to said parameter $a$ and for summing same with said signal corresponding to said parameter $X_0$, second means connected to the Y input terminal for attenuating said cosine signal in proportion to said parameter $b$ and for summing same with said signal corresponding to said parameter $Y_0$, timing means including a switching element operative in response to the amplitude of said $\tau$ signal for initially connecting said sine and cosine signal generating means from said rate signal generating means, and means for reversing the polarity of the input signal being applied to said rate signal generating means whenever the output signal from said rate signal generating means rises to a predetermined amplitude.

12. In a system for generating rectangular coordinate functions for application to the X and Y input terminals of a rectangular coordinate plotting device, the combination comprising a source of data providing polarized electrical signals corresponding to the line parameters $X_0$, $Y_0$, $a$, $b$, $\tau$ and $\theta$, wherein $a$ and $b$ correspond to either the initial and final radius of an arcuate line or the abscissa and ordinate of a straight line, $X_0$, $Y_0$ correspond to the rectangular coordinate origin of either the straight or the arcuate line, $\tau$ corresponds to the length of the line, and $\theta$ corresponds to the angular displacement of the starting point of the $\tau$ signal from a reference axis, means connected to said source of data and responsive to said $a$ and $b$ signals for generating a rate signal which is proportional to the larger of the parameters $a$ or $b$, means impressing said $\theta$ signal on said generating means for establishing an initial amplitude and polarity of said rate signal, means generating a sine and a cosine signal responsive to said rate signal, first means connected to the X input terminal for attenuating said sine signal in proportion to said parameter $a$ and for summing same with said parameter $X_0$, second means connected to the Y input terminal for attenuating said cosine signal in proportion to said parameter $b$ and for summing same with said parameter $Y_0$, timing means including a switching element operative in response to said $\tau$ signals for initially connecting said sine and cosine signal generating means from said rate signal generating means, and means responsive to the polarity of said Y signal for rendering said $\theta$ signal impressing means and said sine and cosine signal generating means ineffective when the polarity of the line parameters identify a straight line, whereby, the said rate signal is applied directly to said first and second attenuating means.

References Cited by the Examiner

UNITED STATES PATENTS

| | | |
|---|---|---|
| 2,793,320 | 5/57 | Patterson et al. |
| 2,875,390 | 2/59 | Tripp. |
| 2,922,940 | 1/60 | Mergler. |
| 3,035,216 | 5/62 | Rhoades et al. _____ 318—162 |

MALCOLM A. MORRISON, *Primary Examiner.*

DARYL W. COOK, *Examiner.*